Inventor.
John W. Connors
by Heard Smith & Tennant.
Attys.

July 8, 1930.  J. W. CONNORS  1,770,026
BUTTONHOLE SEWING MACHINE
Filed Nov. 22, 1926  4 Sheets-Sheet 4

Inventor.
John W. Connors
by Heard Smith & Tennant.
Attys.

Patented July 8, 1930

1,770,026

UNITED STATES PATENT OFFICE

JOHN W. CONNORS, OF DEDHAM, MASSACHUSETTS, ASSIGNOR TO THE REECE BUTTON HOLE MACHINE COMPANY, OF BOSTON, MASSACHUSETTS, A CORPORATION OF MAINE

BUTTONHOLE-SEWING MACHINE

Application filed November 22, 1926. Serial No. 149,855.

This invention relates to buttonhole sewing machines of the type designed to sew a buttonhole with a so-called "fly bar" and the object of the invention is to provide an attachment by which the fly bar buttonhole may be made either with or without an eye at the end opposite the fly bar.

In order to give an understanding of the invention I have illustrated in the drawings a selected embodiment thereof which will now be described after which the novel features will be pointed out in the appended claims.

Figures 5, 6, 7, 8, 9:
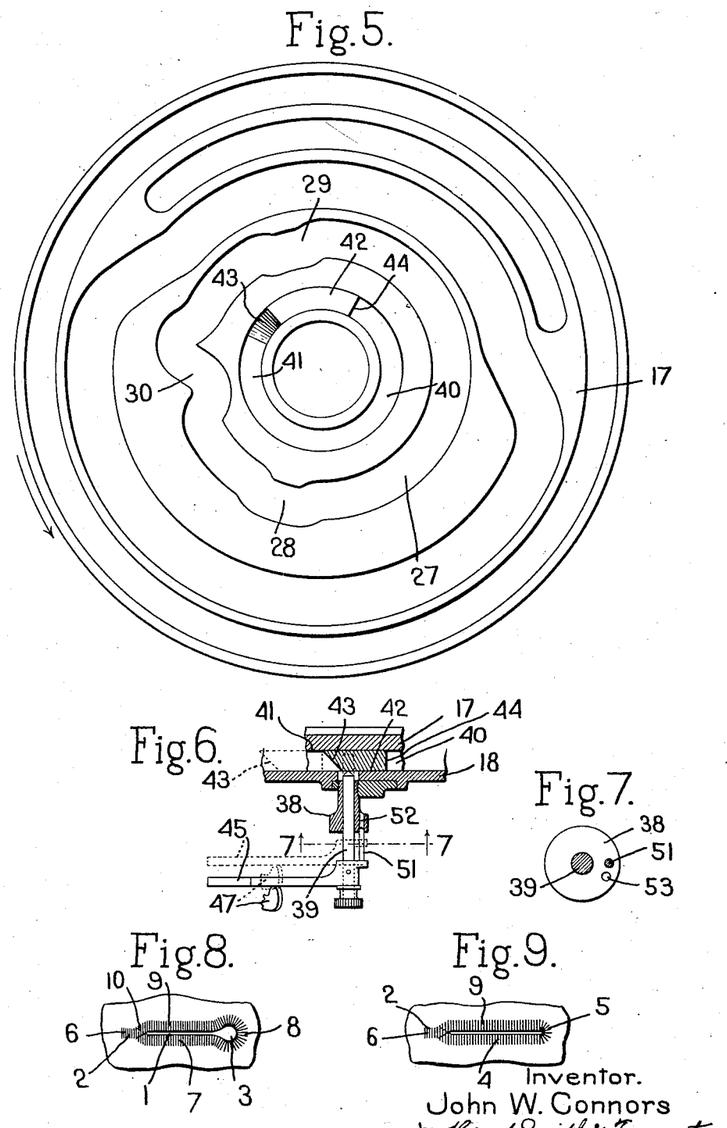
Fig. 5 shows a view of the main cam.
Fig. 6 is a section on the line 6—6, Fig. 2.
Fig. 7 is a section on the line 7—7, Fig. 6.
Fig. 8 illustrates a fly bar buttonhole with an eye.
Fig. 9 illustrates a fly bar buttonhole without the eye.

Before describing the structural features of the sewing machine I will refer to Figs. 8 and 9 which show the two types of fly bar buttonhole which can be made with this invention. In Fig. 8, 1 indicates the usual fly bar buttonhole having a fly bar 2 at one end and the eye 3 at the opposite end. In Fig. 9 a fly bar buttonhole is shown at 4 which has a fly bar 2 at one end but is without the eye at the opposite end 5.

In making a fly bar buttonhole with an eye such as shown in Fig. 8 the stitching starts at the point 6 which is in line with the buttonhole slit and the first few stitches are formed in the line of said slit. After the stitches have been carried the length of the bar then the work-holding means and stitch-forming mechanism are given a relative lateral movement so that during the feeding movement the stitching is carried along one side of the buttonhole as shown at 7. When the eye end of the buttonhole is reached then the work-holding means and stitch-forming mechanism are given a further lateral movement in one direction and as the stitch-forming mechanism turns around the end of the buttonhole the work-holding means and stitch-forming mechanism are given a relative lateral movement in the opposite direction during which the stitches 8 are formed, and when the stitch-forming mechanism has completely turned around the eye it and the work-holding means are given a slight lateral movement in the first-named direction to bring the stitch-forming mechanism into position to form the stitches 9 along the opposite side of the buttonhole. When the end 10 of the buttonhole has been reached the stitch-forming mechanism and work-holding means are given a lateral movement so that the stitching will be in the line of the slit of the buttonhole and the feeding is continued to carry the stitching back along to the point 6. This makes the fly bar 2 which is in line with the slit of the buttonhole and which is formed of two series of stitches with the stitches of one series superposed on those of the other, one series being made at the beginning of the buttonhole and the other at the end of the buttonhole. To make this fly bar buttonhole with the eye, therefore, involves a relative lateral movement between the stitch-forming mechanism and work-holding means at the bar end of the buttonhole and a double lateral movement in forming the stitches 8 around the eye end of the buttonhole. A buttonhole sewing machine of the type above mentioned is illustrated in Patent No. 655,637, dated August 7, 1900.

My invention provides an attachment by which the double relative lateral movement involved in making the eye 3 of the buttonhole may be eliminated at the will of the operator so that when the stitch-forming mechanism comes to the end of the buttonhole it simply makes its usual half rotation without any relative lateral motion thus making a buttonhole with a round end 5 as shown in Fig. 9.

I will now refer to the mechanism which

Figure 1:
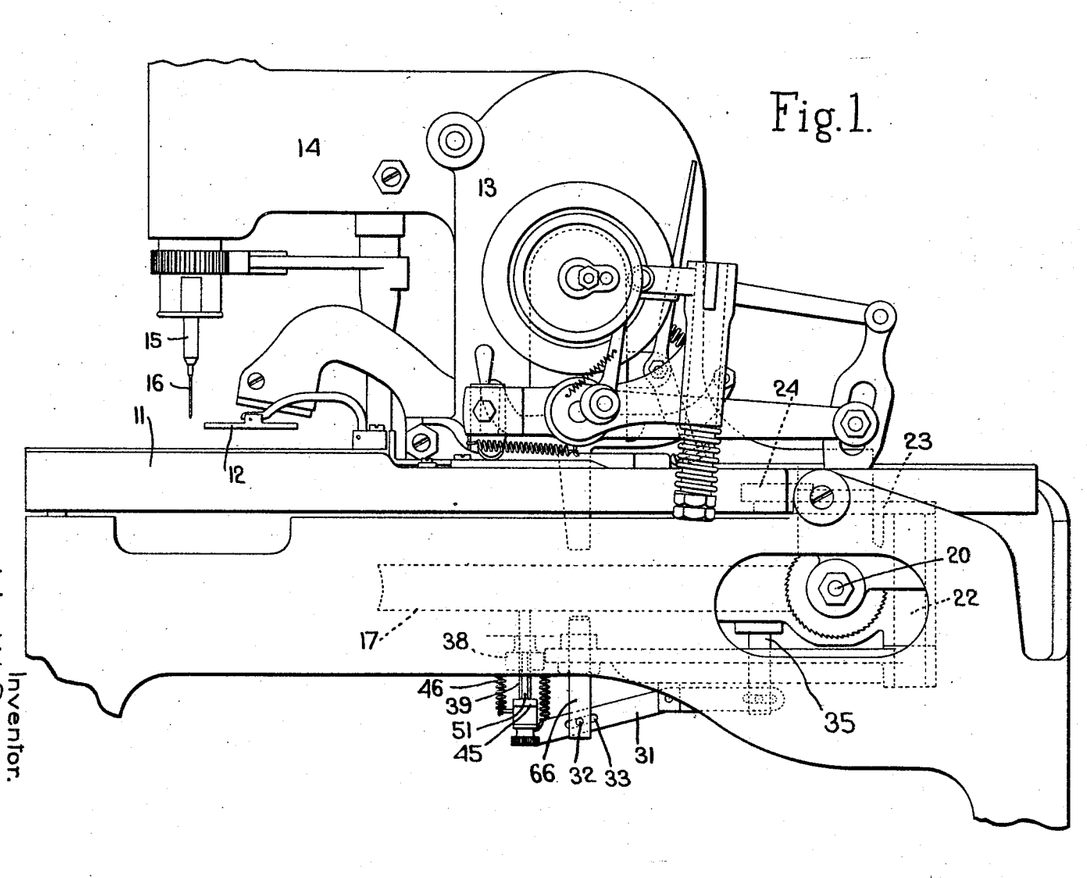
Fig. 1 is a side view of a buttonhole sewing machine embodying my invention.

I have provided for securing this end. In Fig. 1 of the drawings wherein I have shown a side view of a buttonhole sewing machine, 11 indicates the bed frame on which the work is clamped by usual work clamps 12, and 13 indicates the head or stitch frame which carries the stitch-forming mechanism and which is provided with the usual overhanging arm 14 in which reciprocates the usual needle bar 15 carrying the upper needle 16. During the stitching on the buttonhole there is a relative feeding movement between the head 13 and the work clamps 12 by which the stitching is carried along one side of the buttonhole and then back to the starting point. This relative feeding movement is secured through the medium of a main cam 17 by mechanism such as is usually employed in sewing machines of this type but which I have not deemed it necessary to illustrate herein as it forms no part of the present invention.

The main cam 17 is located within a cam housing 18 which is rigid with the head 13 and said cam is driven from a worm gear 19 fast on a cam driving shaft 20 which is journalled in bearings rigid with the cam housing 18, the cam 17 having worm teeth on its periphery with which the worm meshes all as usual in sewing machines of this type.

The relative lateral movement between the stitch-forming mechanism and work-holding means which takes place at the end of the buttonhole is secured as usual in machines of this type by giving the cam housing and head 13 a lateral movement on the bed frame 11 and the means herein illustrated for thus securing the lateral movement is that commonly employed in this type of sewing machine.

The cam housing is formed with a boss 21 in which is journalled a stud 22, the upper end of the stud having an arm 23 rigid therewith which is formed with a shoe 24 that is received in a groove 25 in the fixed bed frame 11. The lower end of the stud 22 has a lever 26 fast thereon which is provided at its forward end with a follower pin 66 that operates in a cam groove 27 in the cam 17. Said cam groove is of the usual shape which is employed in sewing a fly bar buttonhole an eye as shown in Fig. 8 and it has the two cam portions 28 and 29, one of which gives the lever 26 a lateral movement as the stitching on the buttonhole begins and the other of which gives said lever a lateral movement as the stitching on the buttonhole is completed thereby to form the fly bar 2. The cam is also provided with a double cam portion 30 which is situated to engage the follower pin and thereby give the lever 26 a lateral movement while the stitch-forming mechanism is turning around the eye end of the buttonhole.

The cam portions 28 and 29 are so arranged that when the machine comes to rest at the end of the buttonhole cycle the follower pin will be engaging one of the cam portions and as the stitching starts said cam portion operates to give the relative lateral movement between the stitch-forming mechanism and work-holding means after the stitches of the fly bar have been made thereby to bring the parts into position for forming the side stitches 7. If the follower pin 66 remains in the cam groove throughout the rotation of the cam 17 then when the end of the buttonhole opposite the fly bar is reached the double cam 30 gives the lever 26 a vibrating movement as the stitch-forming mechanism is sewing around the end of the buttonhole thereby to form the eye and as the buttonhole is being completed the other cam portion 29 gives the lever 26 a lateral movement to complete the fly bar.

In order to make the fly bar buttonhole without the eye, as shown in Fig. 9, I have provided herein adjustable means which in one adjusted position will render the cam portion 30 of the cam groove ineffective so that there will be no lateral movement of the lever 26 during the sewing around the eye end of the buttonhole. This is accomplished by means which can be set at the will of the operator to automatically withdraw the follower pin 66 from the cam groove 27 while the sewing is being carried around the end of the buttonhole and at the same time locking the head 13 from lateral movement. When these conditions obtain then the stitch-forming mechanism will simply turn around the end of the buttonhole and a buttonhole with a round end 5 will be formed as shown in Fig. 9.

Figure 4:
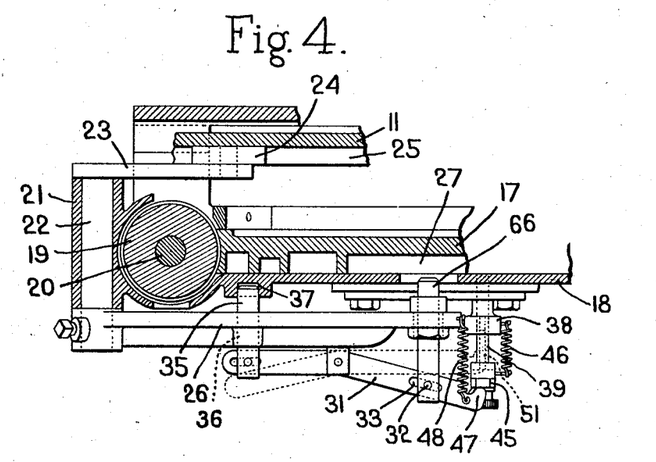
Fig. 4 illustrates the attachment set for a fly bar buttonhole without the eye.

For accomplishing this I have provided the following mechanism. Pivoted to the lever 26 is another lever 31 to one end of which the follower pin 66 is connected, the latter having a pin 32 therein which operates in a slot 33 in the lever 31. The follower pin 66 is mounted to slide vertically through a boss or bearing 34 on the lever 26. The opposite end of the lever 31 has an anchoring pin 35 connected thereto by a pin-and-slot connection, said anchoring pin being slidably mounted in an opening 36 formed in the lever 26 and when projected adapted to lock into a recess 37 formed in the cam housing 18. When the follower pin 66 is withdrawn from the cam groove 27 as shown in Fig. 4 and the anchoring pin 35 is inserted into the recess 37 then the cam housing and the head 13 are held from lateral vibrating movement and can move relatively only in the direction of the length of the buttonhole.

I have provided means herein whereby when a buttonhole such as shown in Fig. 9 is desired the lever 31 will be automatically manipulated to withdraw the follower pin 66 from the groove 27 while sewing around the eye end of the buttonhole and at the same time the anchoring pin 35 will be projected into the recess 37 thus locking the head 13 against lateral movement, and whereby after the stitching has been carried around the end of the buttonhole and while the stitching 9 is being formed said lever 31 is again manipulated to reinsert the follower pin 66 into the groove 27 and to withdraw the anchoring pin from the recess 37.

The means herein shown for accomplishing this is as follows. Slidably mounted in a boss 38 secured to the cam housing is a pin or stud 39, the inner end of which operates in a cam groove 40 formed in the cam 17. This cam groove is concentric but is provided with a low portion 41 and a high portion 42. One end of the high portion 42 connects with the low portion 41 through an incline cam portion 43 and the other end of the high portion 42 connects with the low portion 41 through an abrupt shoulder 44. This pin 39 has fast thereon an arm 45 and said arm has connected thereto a spring 46 which tends to move the pin 39 upwardly and keep it in the groove 40. The arm 45 and the pin 39 may be swung about said pin as an axis so as to place said arm either in its operative position shown in full lines Fig. 2 or in its inoperative position shown in dotted lines.

The parts are so constructed that when the pin 39 is travelling in the low portion of the cam groove 40 the arm 45 will be raised by the spring 46 into a position above the end 47 of the lever 31 so that when the arm 45 is swung into its operative position it will overlie said end of the lever. The lever 31 is acted on by a spring 48 which normally holds it in the position shown in Fig. 3. Assuming that the arm 45 has been swung into its operative position shown in full lines Fig. 2 then as the cam 17 rotates and the high portion 42 thereof passes over the end of the pin 39 said pin will be forced downwardly as indicated in Figs. 4 and 6 and such downward movement will cause the arm 45 to engage the end 47 of the lever 31 and thus swing the lever into the position shown in Fig. 4, in which position the follower pin 66 is withdrawn from the cam groove 27 and the anchoring pin 35 is projected into the recess 37. As soon as the pin passes off from the high portion of the cam the springs 46, 48 will restore the parts to their normal position and will cause the follower pin 66 to re-enter the cam groove 27.

The cam 40 is so situated that the cam face engages the pin 39 before the side stitches 7 are completed so that during the formation of the last side stitches 7 the pin 39 is riding up the cam face 43. The pin reaches the high portion 42 of the cam just before the stitch-forming mechanism begins to turn around the end of the buttonhole and said high portion is of such extent that the pin 39 will remain in engagement therewith, as shown in Fig. 6, during the entire time that the stitch-forming mechanism is turning around the end of the buttonhole and until the stitches 9 have been started along the second side of the buttonhole. After the forming of the stitches 9 has begun the pin 39 will drop off from the abrupt shoulder 44 into the low portion of the cam and when this occurs the springs 46 and 48 will restore the parts to their normal position and thus cause the follower pin 66 to re-enter the cam groove 27 and re-establish the proper relation for completing the fly bar at the end of the buttonhole.

Figure 2:
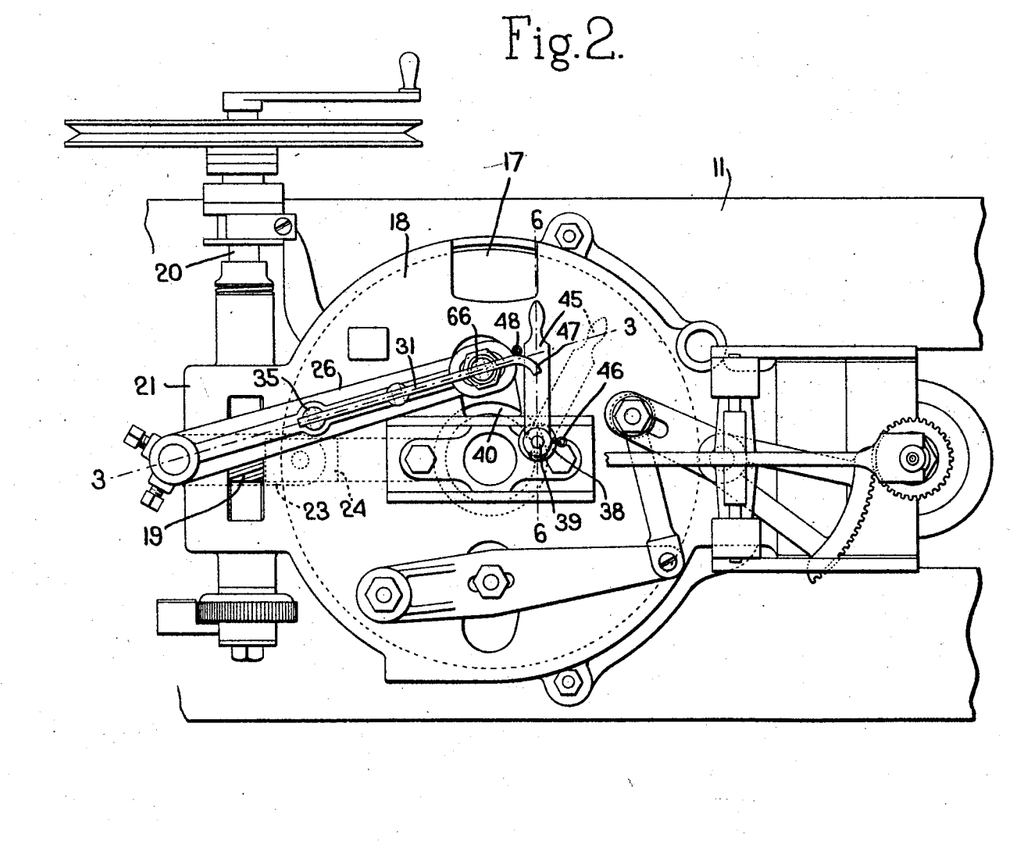
Fig. 2 is an under side view of the bed plate showing the cam housing.
Figure 3:
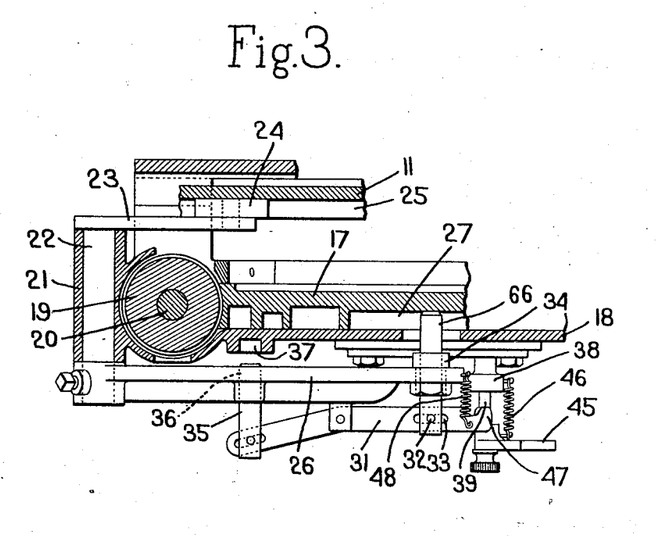
Fig. 3 is a section on substantially the line 3—3, Fig. 2 showing the attachment set for forming a fly bar buttonhole with an eye.

When it is desired to sew the buttonhole with the eye as shown in Fig. 8 then the arm 45 will be thrown into its inoperative position shown in dotted lines Fig. 2, in which case the follower pin will remain in the cam groove 27 throughout the buttonhole cycle. In order to hold the arm 45 in its operative position I have shown it as provided with a positioning pin 51 adapted to slide in an opening 52 formed in the boss 38. The engagement of this positioning pin 51 in the opening 52 prevents the arm 45 from turning and holds it in its operative position while permitting it to be moved vertically. When the arm is to be moved into inoperative position it is forced downwardly sufficiently to withdraw the pin 51 from the locking aperture 52 and then it may be swung into the dotted line position.

The boss 38 is shown as provided with a spot or indentation 53 to receive the end of the pin 51 when the arm 45 is in its inoperative position, the engagement of the pin with the indentation serving to lock the arm in said inoperative position. The arm 45 constitutes a control member which is under the manual control of the operator and which by its adjustment determines whether the buttonhole will be formed with or without an eye.

While I have herein illustrated a selected embodiment of my invention I do not wish to be limited to the constructional features shown.

I claim:

1. In a buttonhole sewing machine, the combination with stitch-forming mechanism and work-holding means movable relative to each other, of means for giving said stitch-forming mechanism and work-holding means a relative lateral movement both at the beginning and at the ending of the buttonhole thereby to form a fly bar, said stitch-forming mechanism being turnable about a vertical axis while sewing around the end of the buttonhole opposite the fly bar, and said means operating to give the stitch-forming mechanism and work-holding means a lateral vibrating movement while so sewing around the end of the buttonhole, and means under the control of the operator to render said last-named means either operative or inoperative while the sewing is being performed around the end of the buttonhole by the turning movement of the stitch-forming mechanism.

2. In a buttonhole sewing machine having stitch-forming mechanism and work-holding means movable relative to each other and in which the stitch-forming mechanism turns about a vertical axis at one end of the buttonhole, the combination with said stitch-forming mechanism and work-holding means, of a cam device for giving said stitch-forming mechanism and work-holding means a relative lateral movement at the beginning and ending of the buttonhole thereby to form a fly bar, and also a vibrating movement while the stitch-forming mechanism is sewing around the end of the buttonhole opposite the fly bar, and means by which said cam device may be rendered either operative or inoperative while the stitching is being formed around the last-named end of the buttonhole.

3. In a buttonhole sewing machine, the combination with stitch-forming mechanism and work-holding means movable relative to each other, said stitch-forming mechanism being turnable about a vertical axis to sew about one end of the buttonhole, means for giving the stitch-forming mechanism and work-holding means a relative lateral movement both at the beginning and at the ending of the buttonhole thereby to form a fly bar, and also a lateral vibrating movement at the end of the buttonhole opposite the fly bar thereby to form an eye, and means to render the last-named means operative or inoperative at the will of the operator while sewing about the end of the buttonhole.

4. In a buttonhole sewing machine, the combination with stitch-forming mechanism and work-holding means having a relative movement, said stitch-forming mechanism being turnable about a vertical axis to sew around one end of the buttonhole, a lever for producing relative lateral movement between the stitch-forming mechanism and work-holding means, a cam member for moving said lever at the beginning and the ending of the buttonhole thereby to form a fly bar, and also while the stitch-forming mechanism is sewing around the end of the buttonhole opposite the fly bar, and means to render said cam either operative or inoperative while so sewing around the last-named end of the the buttonhole.

5. In a buttonhole sewing machine having stitch-forming mechanism and work-holding means arranged to have a relative forward and return movement during each sewing cycle and in which the sewing mechanism turns while sewing about one end of the buttonhole, the combination with said stitch-forming mechanism and work-holding means, of means to give said stitch-forming mechanism and work-holding means a relative lateral movement at the beginning and ending of the buttonhole thereby to form a fly bar, and also to give said stitch-forming mechanism and work-holding means a relative lateral vibrating movement while sewing around the end of the buttonhole opposite the fly bar thereby to form an eye, and adjustable controlling means operative in one adjusting position to automatically render inoperative the means for producing relative lateral movement between the stitch-forming mechanism and work-holding means while sewing around the said last-named end of the buttonhole.

6. In a buttonhole sewing machine having stitch-forming mechanism and work-holding means arranged to have a relative forward and return movement during the buttonhole cycle and in which the stitch-forming mechanism turns while sewing around one end of the buttonhole, the combination with said stitch-forming mechanism and work-holding means, of a cam to give said stitch-forming mechanism and work-holding means a relative lateral movement at the beginning and the ending of the buttonhole thereby to form a fly bar and also while sewing around the end of the buttonhole opposite the fly bar thereby to form an eye, adjustable means operative in one position to automatically render said cam inoperative while sewing around the said last-named end of the buttonhole.

7. In a buttonhole sewing machine having stitching-forming mechanism and work-holding means arranged to have a relative forward and return movement during the buttonhole cycle and in which the stitch-forming mechanism turns while sewing around one end of the buttonhole, the combination with said stitch-forming mechanism and work-holding means, of a cam to give said stitch-forming mechanism and work-holding means a relative lateral movement at the beginning and the ending of the buttonhole thereby to form a fly bar and also while sewing around the end of the buttonhole opposite the fly bar thereby to form an eye, adjustable means operative in one position to automatically render said cam device inoperative while sewing around the said last-named end of the buttonhole, and to render said cam operative again while completing the buttonhole.

8. In a buttonhole sewing machine having a stitch-forming mechanism and work-holding means arranged to have a relative forward and return movement during the buttonhole cycle and in which the stitch-forming mechanism turns while sewing around one end of the buttonhole, the combination with said stitch-forming mechanism and work-holding means, of a cam to give said stitching-forming mechanism and work-holding means a relative lateral movement at the beginning and the ending of the buttonhole thereby to form a fly bar and also while sewing around the end of the buttonhole opposite the fly bar thereby to form an eye, adjustable means operative in one position to automatically render said cam device inoperative and to hold the stitch-forming mechanism and work-holding means from relative lateral movement while sewing around the said last-named end of the buttonhole.

9. In a buttonhole sewing machine having stitching-forming mechanism and work-holding means arranged to have a relative forward and return movement during the buttonhole cycle and in which the stitch-forming mechanism turns around while sewing one end of the buttonhole, the combination with said stitch-forming mechanism and work-holding means, of a cam, a lever actuated thereby for giving a relative lateral movement to the work-holding means and stitch-forming mechanism while the latter is turning about the end of the buttonhole, and adjustable means operative in one position automatically to disengage the lever from the cam and simultaneously lock the stitch-forming mechanism and work-holding means from relative lateral movement while the stitching is being carried around the said end of the buttonhole.

10. In a buttonhole sewing machine having stitch-forming mechanism and work-holding means arranged to have a relative forward and return movement during the buttonhole cycle and in which the stitch-forming mechanism turns around while sewing one end of the buttonhole, the combination with said stitch-forming mechanism and work-holding means, of a cam, a lever actuated thereby for giving a relative lateral movement to the work-holding means and stitch-forming mechanism while the latter is turning about the end of the buttonhole, and adjustable means operative in one position automatically to disengage the lever from the cam and simultaneously lock the stitch-forming mechanism and work-holding means from relative lateral movement while the stitching is being carried around the said end of the buttonhole and to re-establish operative connections between said cam and lever during the completion of the buttonhole.

11. In a buttonhole sewing machine having stitch-forming mechanism and work-holding means arranged to have a relative forward and return movement during the buttonhole cycle and in which the stitch-forming mechanism turns about the end of the buttonhole, the combination with said stitch-forming mechanism and work-holding means, of a cam, a lever, a follower pin carried by the lever and engaging the cam, means whereby the cam-actuated movement of the lever produces a relative lateral movement between the stitch-forming mechanism and work-holding means at each end of the buttonhole, means adjustable in one position to automatically withdraw the follower pin from operative engagement with the cam at one end of the buttonhole while the stitch-forming mechanism is sewing about the end of the buttonhole and to engage the follower pin again with the cam during the completion of the buttonhole.

12. In a buttonhole sewing machine having stitch-forming mechanism and work-holding means arranged to have a relative forward and return movement during the buttonhole cycle and in which the stitch-forming mechanism turns to sew around one end of the buttonhole, the combination with said stitch-forming mechanism and work-holding means, of a lever for producing a relative lateral movement between said stitch-forming mechanism and work-holding means, a cam, a follower pin carried by said lever and engaging said cam, said cam being constructed to give the lever a movement at the beginning and the ending of the buttonhole thereby to form a fly bar, and also while sewing around the end of the buttonhole opposite the fly bar, and adjustable means operative in one position automatically to withdraw the follower pin from engagement with the cam while sewing around the last-named end of the buttonhole.

13. In a buttonhole sewing machine having stitch-forming mechanism and work-holding means arranged to have a relative forward and return movement during the buttonhole cycle and in which the stitch-forming mechanism turns to sew around one end of the buttonhole, the combination with said stitch-forming mechanism and work-holding means, of a lever for producing a relative lateral movement between said stitch-forming mechanism and work-holding means, a cam, a follower pin carried by said lever and engaging said cam, said cam being constructed to give the lever a movement at the beginning and the ending of the buttonhole thereby to form a fly bar, and also while sewing around the end of the buttonhole opposite the fly bar, and adjustable means operative in one position automatically to withdraw the follower pin from engagement with the cam while sewing around the last-named end of the buttonhole, and to engage again the follower pin during the completion of the buttonhole.

14. In a buttonhole sewing machine having stitch-forming mechanism and work-holding means arranged to have a relative forward and return movement during the buttonhole cycle and in which the stitch-forming mechanism turns to sew around one end of the buttonhole, the combination with said stitch-forming mechanism and work-holding means, of a lever for producing a relative lateral movement between said stitch-forming mechanism and work-holding means, a cam, a follower pin carried by said lever and engaging said cam, said cam being constructed to give the lever a movement at the beginning and the ending of the buttonhole thereby to form a fly bar, and also while sewing around the opposite end of the buttonhole, and adjustable means operative in one position to withdraw the follower pin automatically from engagement with the cam during the sewing of the stitches on the first side of the buttonhole and to re-engage said follower pin with the cam during the sewing of the stitches along the opposite side of the buttonhole.

15. In a buttonhole sewing machine having stitch-forming mechanism and work-holding means arranged to have a relative forward and return movement during the buttonhole cycle and in which the stitch-forming mechanism turns to sew around one end of the buttonhole, the combination with said stitch-forming mechanism and work-holding means, of a lever for producing a relative lateral movement between said stitch-forming mechanism and work-holding means, a cam, a follower pin carried by said lever and engaging said cam, said cam being constructed to give the lever a movement at the beginning and the ending of the buttonhole thereby to form a fly bar, and also while sewing around the opposite end of the buttonhole, and adjustable means operative in one position to withdraw the follower pin automatically from engagement with the cam during the sewing of the stitches on the first side of the buttonhole and to re-engage said follower pin with the cam during the sewing of the stitches along the opposite side of the buttonhole, and to hold said stitch-forming mechanism and work-holding means from relative lateral movement while the follower pin is so withdrawn.

16. In a buttonhole sewing machine, the combination with stitch-forming mechanism and work-holding means having a relative movement, said stitch-forming mechanism being turnable about a vertical axis to sew around one end of the buttonhole, a lever for producing relative lateral movement between the stitch-forming mechanism and work-holding means, a cam member for moving said lever at the beginning and at the ending of the buttonhole thereby to for a fly bar and also while the stitch-forming mechanism is sewing around the end of the buttonhole opposite the fly bar, means operated by said cam member to remove the lever from the control of the cam member while sewing around the last-named end of the buttonhole, and means under the control of the operator to render the last-named means either operative or inoperative.

17. In a buttonhole sewing maching having stitch-forming mechanism and work-holding means arranged to have a relative forward and return movement during the buttonhole cycle and in which the stitch-forming mechanism turns while sewing around one end of the buttonhole, the combination with said stitch-forming mechanism and work-holding means, of a cam, devices operated thereby to give said stitch-forming mechanism and work-holding means a relative lateral movement at the beginning and at the ending of the buttonhole thereby to form a fly bar and also while sewing around the end of the buttonhole opposite the fly bar thereby to form an eye, and controlling means manually adjustable into either operative or inoperative position and when in operative position being actuated by the cam to render inoperative the devices for producing said relative lateral movement.

18. In a buttonhole sewing machine having stitch-forming mechanism and work-holding means arranged to have a relative forward and return movement during the buttonhole cycle and in which the stitch-forming mechanism turns while sewing around one end of the buttonhole, the combination with said stitch-forming mechanism and work-holding means, of a cam, devices operated thereby to give said stitch-forming mechanism and work-holding means a relative lateral movement at the beginning and at the ending of the buttonhole thereby to form a fly bar and also while sewing around the end of the buttonhole opposite the fly bar thereby to form an eye, and controlling means manually adjustable into either operative or inoperative position and when in operative position being actuated by the cam to render inoperative the devices for producing said relative lateral movement, and simultaneously to lock the stitch-forming mechanism and work-holding means against relative lateral movement.

19. In a buttonhole sewing machine having stitch-forming mechanism and work-holding means arranged to have a relative forward and return movement during the sewing cycle, and in which the stich-forming mechanism turns around while sewing one end of the buttonhole, the combination with said stitch-forming mechanism and work-holding means, of a lever for moving the stitch-forming mechanism and work-holding means relatively in a lateral direction while the stitch-forming mechanism is turning around the end of the buttonhole, a cam for actuating the lever, means operated by said cam to remove the lever from the control of the cam while the stitch-forming mechanism is thus turning about the end of the buttonhole, and means under the control of the operator to render said last-named means either operative or inoperative.

20. In a buttonhole sewing machine having stitch-forming mechanism and work-holding means arranged to have a relative forward and return movement during the sewing cycle, and in which the stitch-forming mechanism turns around while sewing one end of the buttonhole, the combination with said stitch-forming mechanism and working-holding means, of a lever for moving the stitch-forming mechanism and work-holding means relatively in a lateral direction while the stitch-forming mechanism is turning around the end of the buttonhole, a cam for actuating the lever, means operated by said cam to remove the lever from the control of the cam while the stitch-forming mechanism is thus turning about the end of the buttonhole, and to lock the said stitch-forming mechanism and work-holding means from relative lateral movement, and means under the control of the operator to render the last-named means either operative or inoperative.

21. In a buttonhole sewing machine having stitch-forming mechanism and work-holding means arranged to have a relative forward and return movement during the sewing cycle and in which the stitch-forming mechanism turns while sewing one end of the buttonhole, the combination with said stitch-forming mechanism and work-holding means, of a lever for giving relative lateral movement to the work-holding means and stitch-forming mechanism while the latter is turning around the end of the buttonhole, a cam for actuating said lever, and controlling means adjustable into either inoperative or operative position and when in operative position being actuated by the cam to remove the lever from control of the cam while the stitch-forming mechanism is sewing around the end of the buttonhole.

22. In a buttonhole sewing machine having stitch-forming mechanism and work-holding means arranged to have a relative forward and return movement during the sewing cycle and in which the stitch-forming mechanism turns while sewing one end of the buttonhole, the combination with said stitch-forming mechanism and work-holding means, of a lever for giving relative lateral movement to the work-holding means and stitch-forming mechanism while the latter is turning around the end of the buttonhole, a cam for actuating said lever, and controlling means adjustable into either inoperative or operative position and when in operative position being actuated by the cam to remove the lever from control of the cam while the stitch-forming mechanism is sewing around the end of the buttonhole, and simultaneously to lock the stitch-forming mechanism and work-holding means from relative lateral movement.

23. In a buttonhole sewing machine having stitch-forming mechanism and work-holding means arranged to have a relative forward and return movement during the sewing cycle and in which the stitch-forming mechanism turns about the end of the buttonhole, the combination with said stitch-forming mechanism and work-holding means, of a lever for giving relative lateral movement between the stitch-forming mechanism and work-holding means, a follower pin carried by the lever, a cam engaging the follower pin and arranged to actuate the lever at each end of the buttonhole, controlling means adjustable into either operative or inoperative position and when in operative position being actuated by the cam to withdraw the follower pin from operative engagement with said cam after one side of the buttonhole has been sewed and while the stitch-forming mechanism is sewing about one end of the buttonhole.

24. In a buttonhole sewing machine having stitch-forming mechanism and work-holding means arranged to have a relative forward and return movement during the sewing cycle and in which the stitch-forming mechanism turns about the end of the buttonhole, the combination with said stitch-forming mechanism and work-holding means, of a lever for giving relative lateral movement between the stitch-forming mechanism and work-holding means, a follower pin carried by the lever, a cam engaging the follower pin and arranged to actuate the lever at each end of the buttonhole, controlling means adjustable into either operative or inoperative position and when in operative position being actuated by the cam to withdraw the follower pin from operative engagement with said cam after one side of the buttonhole has been sewed and while the stitch-forming mechanism is sewing about one end of the buttonhole, and to engage the follower pin again with the cam during the completion of the buttonhole.

25. In a buttonhole sewing machine having stitch-forming mechanism and work-holding means arranged to have a relative forward and return movement during the sewing cycle and in which the stitch-forming mechanism turns about the end of the buttonhole, the combination with said stitch-forming mechanism and work-holding means, of a lever for giving relative lateral movement between the stitch-forming mechanism and work-holding means, a follower pin carried by the lever, a cam engaging the follower pin and arranged to actuate the lever at each end of the buttonhole, controlling means adjustable into either operative or inoperative position and when in operative position being actuated by the cam to withdraw the follower pin from operative engagement with said cam after one side of the buttonhole has been sewed and while the stitch-forming mechanism is sewing about one end of the buttonhole, and simultaneously to lock the stitch-forming mechanism and work-holding means from relative lateral movement while the work is being done around the end of the buttonhole and to release said lock and re-engage the follower pin with the cam during the completion of the buttonhole.

26. In a buttonhole sewing machine, the combination with a bed frame, of a stitch frame mounted thereon and carrying stitch-forming mechanism, the latter being turnable about a vertical axis to sew around one end of the buttonhole, a main cam for moving the stitch frame in the direction of the length of the buttonhole during the sewing of the latter, means actuated by said main cam for giving the stitch frame a relative lateral movement at the beginning and the end of the buttonhole thereby to form a fly bar and also while the stitch-forming mechanism is sewing around the end of the buttonhole opposite the fly bar, and means to render the last-named means either operative or inoperative while the sewing is being done around the last-named end of the buttonhole.

27. In a buttonhole sewing machine, the combination with a bed frame, of a stitch frame movably mounted thereon and carrying stitch-forming mechanism, means to move the stitch frame in the direction of the length of the buttonhole during the sewing of the latter, means for giving said stitch frame a lateral movement at both the beginning and ending of the buttonhole thereby to form a fly bar and at the end of the buttonhole opposite the fly bar thereby to form an eye, and means to render the last-named means either operative or inoperative while the stitch-forming mechanism is sewing around the end of the buttonhole.

28. In a buttonhole sewing machine, the combination with a bed frame, of a stitch frame carrying stitch-forming mechanism which is turnable about a vertical axis at one end of the buttonhole, a main cam, means operated thereby to give the stitch frame a feeding movement longitudinally of the buttonhole, other means operated thereby for giving the stitch frame a lateral movement at the beginning and at the end of the buttonhole thereby to form a fly bar and also at the end opposite the fly bar, and means to render said other means either operative or inoperative at the will of the operator while the stitch-forming mechanism is turning around the end of the buttonhole.

In testimony whereof, I have signed my name to this specification.

JOHN W. CONNORS.